United States Patent
Chen

(10) Patent No.: US 8,970,777 B2
(45) Date of Patent: Mar. 3, 2015

(54) STRUCTURE OF A RING FLASH MODULE

(71) Applicant: Hon Hai Precision Industry Co., Ltd., New Taipei (TW)

(72) Inventor: Yu-Han Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/851,972

(22) Filed: Mar. 28, 2013

(65) Prior Publication Data

US 2014/0146225 A1    May 29, 2014

(30) Foreign Application Priority Data

Nov. 28, 2012  (TW) ................................ 101144606

(51) Int. Cl.
  *H04N 5/222*   (2006.01)
  *G03B 15/05*   (2006.01)
(52) U.S. Cl.
  CPC ..................................... *G03B 15/05* (2013.01)
  USPC ........................................................ 348/371
(58) Field of Classification Search
  USPC .................................................. 348/370, 371
  See application file for complete search history.

(56) References Cited

U.S. PATENT DOCUMENTS

| | | | | |
|---|---|---|---|---|
| 7,432,978 B2* | 10/2008 | Storm | ........................... | 348/376 |
| 8,229,502 B2* | 7/2012 | Gavelle et al. | ............. | 455/556.1 |
| 8,743,275 B1* | 6/2014 | Han | ............................... | 348/371 |
| 2003/0013484 A1* | 1/2003 | Nishimura et al. | ........... | 455/556 |
| 2003/0030745 A1* | 2/2003 | Meek et al. | ..................... | 348/370 |
| 2004/0183940 A1* | 9/2004 | Raskar | ........................... | 348/371 |
| 2008/0266445 A1* | 10/2008 | Park | ............................. | 348/370 |
| 2011/0032370 A1* | 2/2011 | Ludwig | ..................... | 348/218.1 |
| 2012/0039592 A1* | 2/2012 | Chou et al. | ..................... | 396/164 |
| 2012/0154672 A1* | 6/2012 | Yamazaki et al. | ............. | 348/370 |
| 2012/0257095 A1* | 10/2012 | Velazquez | ............... | 348/333.01 |
| 2013/0135521 A1* | 5/2013 | Burrell | ........................... | 348/370 |
| 2013/0181523 A1* | 7/2013 | Zhang et al. | .................... | 307/35 |

* cited by examiner

*Primary Examiner* — Albert Cutler
(74) *Attorney, Agent, or Firm* — Novak Druce Connolly Bove + Quigg LLP

(57) ABSTRACT

The disclosure relates to a flash lighting module for providing flash lighting for a camera of a mobile communication device such as a mobile phone, a smart phone or a tablet computer having a phone communication capability. The flash lighting module includes a relay, at least one driver, and a plurality of light sources; the relay is in serial communication with the driver; the driver is electrically connected to the light sources; the light sources include at least three LEDs which are equidistantly arranged around the camera.

14 Claims, 4 Drawing Sheets

STRUCTURE OF A RING FLASH MODULE

BACKGROUND

1. Technical Field

The present disclosure relates to a ring flash module, and particularly to a mobile device with a ring flash module which generates a uniform luminance.

2. Description of Related Art

Most 3C electronic products are designed to be light, thin, short, small, especially for mobile phones and tablet PCs. Such mobile devices list the camera function as basic equipment. The camera includes the flash module as a complementary light source for taking pictures. However, because of the restrictions of the installation space in the device, the light emitting diode (LED) with small volume is used as the complementary light source. A single LED chip may be arranged as a flash module, or two LED chips arranged in a line, are positioned at a side of the lens. Using these two kinds of flash modules as a complementary light source, because the light source is beside the lens, it is likely to cause flash shadow, which in turn may produce serious image defects such as insufficient exposure at one side of the picture. The light source being set on the side of the lens provides a non-uniform light distribution, which is not conducive to capturing images in low ambient light conditions, nor is the required brightness for video post-production provided.

Therefore, there is a need to provide a ring flash module to overcome the aforementioned problems.

BRIEF DESCRIPTION OF THE DRAWINGS

Many aspects of the present ring flash module can be better understood with reference to the following drawings. The components in the drawings are not necessarily drawn to scale, the emphasis instead being placed upon clearly illustrating the principles of the present ring flash module. In the drawing, all the views are schematic.

DETAILED DESCRIPTION

Figure 1:
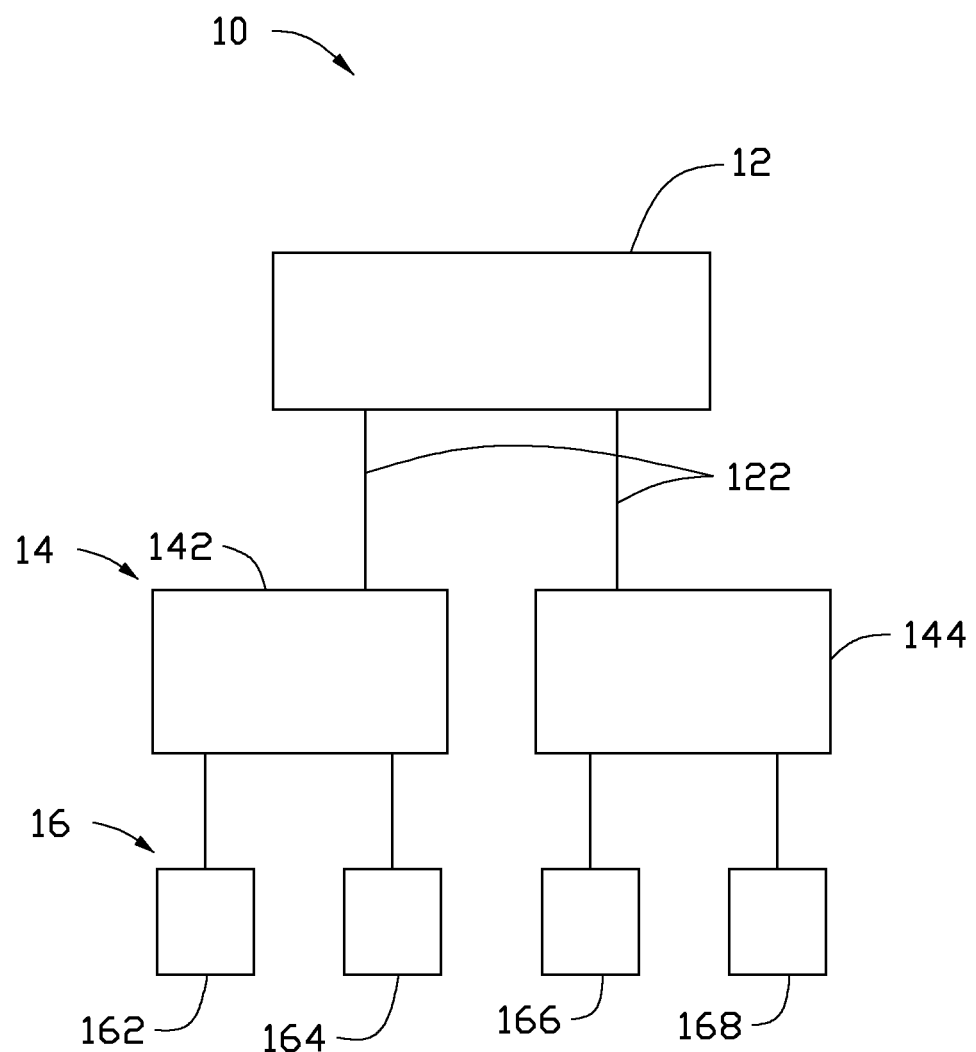
FIG. 1 is a block diagram of a circuitry of the ring flash module in accordance with a first embodiment.

Referring to FIG. 1, a ring flash module 10, includes a relay 12, two drivers 14, and four light sources 16. The relay 12 is in serial communication with the drivers 14, wherein each driver 14 is electrically connected to two light sources 16. In the first embodiment, the relay 12 is a double pole double throw (DPDT) switch in the ring flash module 10, which is used for switching the connection of the drivers 14 and a baseband circuitry of a mobile device (not shown), such a mobile phone, a smart phone, or a tablet computer so that the drivers 14 can be input with required parameters (i.e., intensity, duration, etc.) for driving the light sources 16 from the baseband circuitry via the relay 12.

The drivers 14 include a first driving chip 142, and a second driving chip 144; the connection between the relay 12 and each of the first and second driving chips 142, 144 is a serial communication bus 122. The serial communication bus 122 is an $I^2C$ (Inter-Integrated Circuit) bus, which is a two-wire-type bidirectional bus; therefore multi-point to multi-point communications can be achieved. In addition, one of the two wires of the serial communication bus 122 is a serial clock line (SCL) and the other one is a serial data line (SDA), which can send and receive data between the relay 12 and each of the drivers 14.

Being an $I^2C$ bus, the serial communication bus 122 has the advantages of simplicity and effectiveness. Because the interface is directly on the top of the component, a very small space is occupied, and the board size and the number of chip pins is reduced, further the interconnection costs are reduced, and the miniaturized design adapts very well to a handheld mobile device.

The light sources 16 consist of light emitting diodes (LEDs), including a first LED 162, a second LED 164, a third LED 166 and a fourth LED 168. The first LED 162 and the second LED 164 are electrically connected to the first driving chip 142. The third LED 166 and the fourth LED 168 are electrically connected to the second driving chip 144. When the first driving chip 142 is operating, the electrically connected first LED 162 and second LED 164 are triggered and will illuminate. Similarly, when the second driving chip 144 is operating, the electrically connected third LED 166 and fourth LED 168 will be triggered and illuminated.

Figure 2:
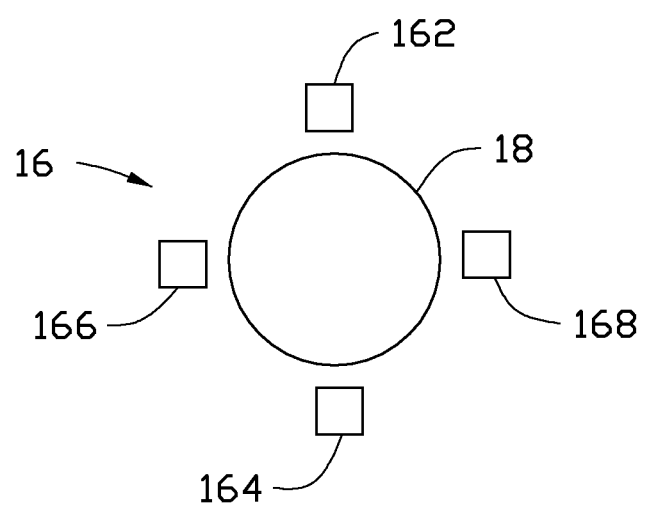
FIG. 2 is a schematic view of the ring flash module of FIG. 1 as the flash light source around a camera lens.

The light sources 16 are arranged in an annular manner around the lens 18 of a camera of the mobile device. As shown in FIG. 2, the light sources 16 include the four light emitting diodes (LEDs) 162, 164, 166, 168, wherein the first LED 162 and the second LED 164 are arranged around the lens 18 at the upper and lower positions. The third LED 166 and the fourth LED 168 are arranged at the left and right positions; the four LEDs 162-168 thus surround the lens 18. The four LEDs 162-168 are equidistantly spaced from each other and located at four vertices of an equilateral rhombus, respectively.

The light sources 16 are on the symmetrical position, which are electrically connected by a driver 14. The first LED 162 and the second LED 164 are symmetrically arranged in the upper and lower positions, and have electrical connections with the first driving chip 142. The third LED 166 and the fourth LED 168 are symmetrically arranged in the left and right positions, and have electrical connections with the second driving chip 144. The driver 14 is separate and independent, receiving the operation parameters from the baseband circuitry through the switching control of the relay 12, and drives the symmetrical illumination of the light sources 16.

In a first embodiment, the first LED 162 and the second LED 164 are illuminated simultaneously. The third LED 166 and the fourth LED 168 are also illuminated simultaneously; thus, any illumination around the lens 18 will be symmetrical. Alternatively, the four LEDs 162-168 can all be illuminated simultaneously. The ring flash module thus provides uniform illumination, and avoids photographic problems arising from a unilateral or one-sided flash of light, thus improving the quality of photographs.

When the driver 14 through the switching control of the relay 12 to separate operation, is able to drive the light source to illuminate on the annularly arranged positions. The first, second, third and fourth LEDs 162, 164, 166, 168 on the peripheral position of the lens 18 can be illuminated simultaneously. Photographic lighting with a more uniform and a greater brightness is better suited to the use of the high dynamic range (HDR) image synthesis. Through using relay 12 to control the illumination positions and the quantities of light from the light source 16, multiple images of different exposures can be captured, then clear photos with normal exposure using software synthesis technology can be obtained.

Figure 3:
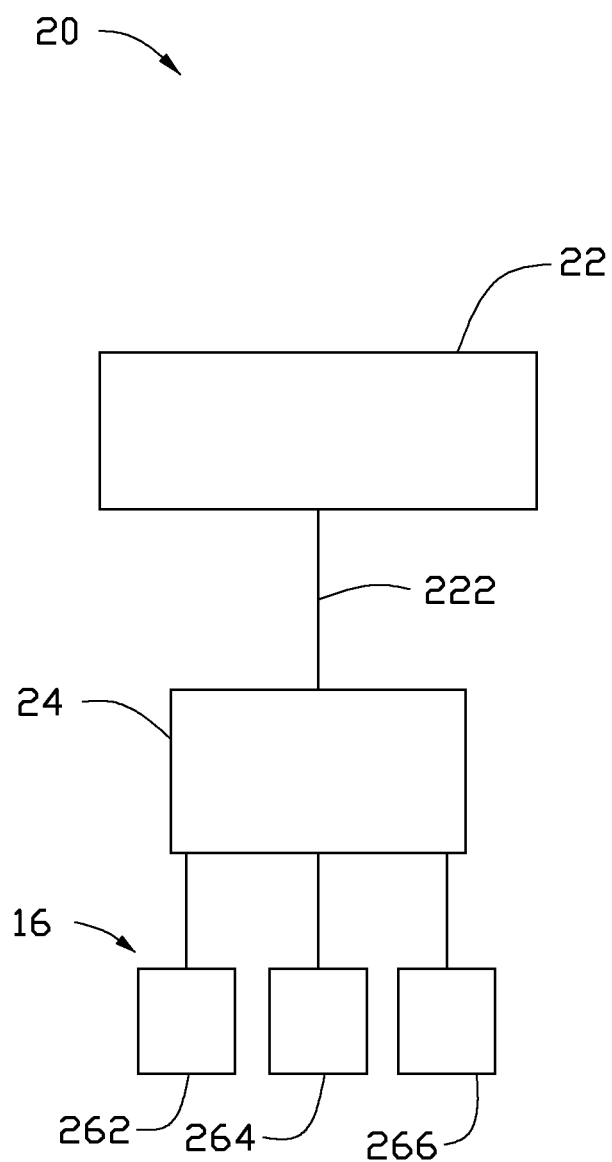
FIG. 3 is a block diagram of a circuitry of the ring flash module in accordance with a second embodiment.

Referring to FIG. 3, a second embodiment is shown. A ring flash module 20, includes a relay 22, a driver 24, and a plurality of light sources 26. The relay 22 uses serial communication bus 222 to connect to the driver 24, the driver 24 is electrically connected to the light source 26 separately. The serial communication bus 222 is an I²C bus. The relay 22 receives commands (i.e., parameters for operating the light source 16) from the baseband circuitry and inputs the commands into the driver 24 whereby driver 24 can properly drive the light source 26 to turn on, to provide lighting for photography.

Figure 4:
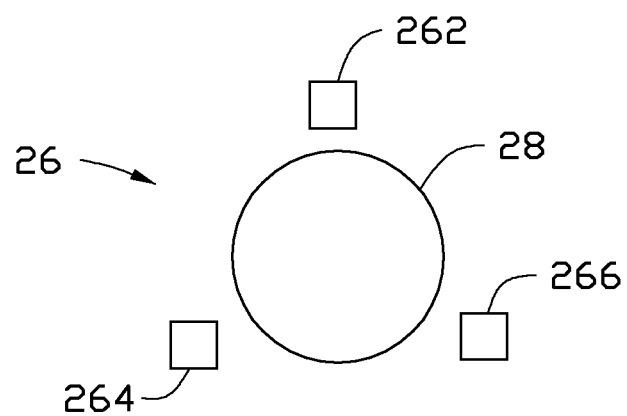
FIG. 4 is a schematic view of the ring flash module of FIG. 3 as the flash light source around a camera lens.

The ring flash module 20 is very similar to the ring flash module 10 in the first embodiment. The only difference is the arrangement of the light source 26, wherein the light source 26 includes a first LED 262, a second LED 264 and a third LED 266, all of which are annularly arranged around the lens 28 in equiangular positions, as shown in FIG. 4. More specific, the three LEDs 262, 264 and 266 are located at three vertices of an equilateral triangle, respectively. In this embodiment, the delay 22 can be omitted whereby the driver 24 is directly connected to the baseband circuitry of the mobile device to directly receive the commands therefrom.

According to the present disclosure, a plurality of light sources are annularly arranged around the lens on handheld mobile device, and the light sources are electrically connected with at least one driver, the relay controls the operation of the driver, driving the light source(s) to illuminate in a ring or at symmetrical positions only, providing optimal uniformity and high brightness of illumination, suitable for different photographic needs, and to obtain a good photographic quality.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A ring flash module for a camera of a mobile device having a baseband circuitry, comprising:
   a relay configured for connection with the baseband circuitry;
   at least one driver in serial communication with the relay; and
   a plurality of light sources in electrical connection with the at least one driver and configured for surrounding the camera;
   wherein the relay is configured for sending operation parameters of the plurality of the light sources from the baseband circuitry to the at least one driver for controlling illuminations of the plurality of the light sources, the at least one driver includes a first driving chip and a second driving chip, the plurality of light sources each are an LED and include a first LED, a second LED, a third LED and a fourth LED, the first LED and the second LED are electrically connected to the first driving chip, and the third LED and the fourth LED are electrically connected to the second driving chip.

2. The ring flash module as claim 1, wherein the relay is a double pole double throw (DPDT) switch.

3. The ring flash module as claim 1, wherein the serial communication between the relay and the at least one driver is an I²C (Inter-Integrated Circuit) bus.

4. The ring flash module as claim 1, wherein the first, second, third and fourth LEDs are arranged at four vertices of a rhombus around the camera.

5. The ring flash module of claim 1 wherein the plurality of light sources each are an LED and includes a first LED, a second LED and a third LED arranged at three apexes of a triangle, respectively.

6. A camera module of a mobile device having a baseband circuitry comprising:
   a lens;
   at least three light emitting diodes (LEDs) mounted around the lens;
   at least one driver electrically connecting with the at least three LEDs for driving the at least three LEDs to lighten;
   at least one serial communication bus in connection with the at least one driver and configured for connecting with the baseband circuitry whereby parameters for controlling lighting of the at least three LEDs can be sent from the baseband circuitry to the at least one driver via the serial communication bus; and
   a relay in connection with the serial communication bus and configured for connecting with the baseband circuitry whereby parameters for controlling lighting of the at least three LEDs is sent from the baseband circuitry to the at least one driver via the relay and the serial communication bus.

7. The camera of claim 6, wherein the at least one serial communication bus is an I²C bus.

8. The camera of claim 7, wherein the at least three LEDs consist essentially of three LEDs which are equidistantly spaced from each other.

9. The camera of claim 6, wherein the at least three LEDs consist essentially of four LEDs.

10. The camera of claim 9, wherein the four LEDs are equidistantly spaced from each other.

11. The camera of claim 9, wherein the at least one driver consists essentially of two drivers each connecting with two corresponding LEDs and the at least one serial communication bus consists essentially of two serial communication buses, each driver further connecting with the relay via a corresponding serial communication bus.

12. The camera of claim 11, wherein the two serial communication buses each are an I²C bus.

13. The camera of claim 12, wherein the I²C bus comprises a serial clock line (SCL) and a serial data line (SDA).

14. The camera of claim 11, wherein the relay is a double pole double throw (DPDT) switch.

* * * * *